US012767862B2

(12) United States Patent
Sun et al.

(10) Patent No.: US 12,767,862 B2
(45) Date of Patent: Oct. 20, 2026

(54) LOW-SILVER-CONTENT HIGH-PERFORMANCE CONDUCTIVE PASTE AND PREPARATION METHOD THEREFOR

(71) Applicant: XUZHOU H-GURAD BIOTECHNOLOGY CO., LTD, Xuzhou (CN)

(72) Inventors: Wen Hsien Sun, Fuzhou (CN); Yu Qiu, Fuzhou (CN); Hao Xiong, Fuzhou (CN); Ping Li, Fuzhou (CN); Zhenjing Kang, Fuzhou (CN)

(73) Assignee: XUZHOU H-GURAD BIOTECHNOLOGY CO., LTD, Xuzhou (CN)

( * ) Notice: Subject to any disclaimer, the term of this patent is extended or adjusted under 35 U.S.C. 154(b) by 135 days.

(21) Appl. No.: 18/709,512

(22) PCT Filed: Nov. 11, 2022

(86) PCT No.: PCT/CN2022/131294

§ 371 (c)(1),
(2) Date: May 13, 2024

(87) PCT Pub. No.: WO2023/083287

PCT Pub. Date: May 19, 2023

(65) Prior Publication Data

US 2025/0002761 A1 Jan. 2, 2025

(30) Foreign Application Priority Data

Nov. 12, 2021 (CN) ........................ 202111338627.4

(51) Int. Cl.

| | |
|---|---|
| ***H01B 1/22*** | (2006.01) |
| ***B05D 5/12*** | (2006.01) |
| ***C09J 5/06*** | (2006.01) |
| ***C09J 9/02*** | (2006.01) |
| ***C09J 11/04*** | (2006.01) |
| ***C09J 175/04*** | (2006.01) |
| *C08K 7/06* | (2006.01) |
| *C08K 7/18* | (2006.01) |
| *C08K 9/02* | (2006.01) |

(52) U.S. Cl.

CPC .................. *C09J 9/02* (2013.01); *B05D 5/12* (2013.01); *C09J 5/06* (2013.01); *C09J 11/04* (2013.01); *C09J 175/04* (2013.01); *H01B 1/22* (2013.01); *C08K 7/06* (2013.01); *C08K 7/18* (2013.01); *C08K 9/02* (2013.01); *C08K 2201/001* (2013.01)

(58) Field of Classification Search

CPC ..... H01B 1/22; C09D 5/24; C09J 9/02; B05D 5/12

See application file for complete search history.

(56) References Cited

U.S. PATENT DOCUMENTS

| | | | | |
|---|---|---|---|---|
| 10,032,538 | B2 * | 7/2018 | Shumaker ................ | H01B 3/40 |
| 2017/0292026 | A1 * | 10/2017 | Zhang ...................... | H01B 1/22 |
| 2021/0202126 | A1 | 7/2021 | Lai et al. | |

FOREIGN PATENT DOCUMENTS

| | | | | | |
|---|---|---|---|---|---|
| CN | 1873838 | A | | 12/2006 | |
| CN | 102676102 | A | | 9/2012 | |
| CN | 103000252 | A | | 3/2013 | |
| CN | 102676102 | B | * | 3/2014 | |
| CN | 105469849 | A | | 4/2016 | |
| CN | 106098147 | B | * | 9/2016 | |
| CN | 106634764 | A | * | 5/2017 | |
| CN | 106675434 | A | * | 5/2017 | |
| CN | 110079266 | A | | 8/2019 | |
| CN | 112852111 | A | | 5/2021 | |
| CN | 112863733 | A | * | 5/2021 | |
| CN | 114023491 | A | | 2/2022 | |
| CN | 115197657 | A | * | 10/2022 | ............ C09J 163/00 |
| JP | 2013251256 | A | * | 12/2013 | |

OTHER PUBLICATIONS

English machine translation of CN1873838 (original in IDS filed May 12, 2024) (Year: 2006).*

Fang et al "Hybrid silver pastes with synergistic effect of multi-scale silver fillers and the application in flexible circuits", Mater. Res. Express 8 (2021) 096303.*

Peng et al "Reinforcement of Ag nanoparticle paste with nanowires for low temperature pressureless bonding", J Mater Sci (2012) 47:6801-6811 DOI 10.1007/s10853-012-6624-7.*

International Search Report for PCT/CN2022/131294 mailed Jan. 13, 2023, ISA/CN.

* cited by examiner

*Primary Examiner* — Mark Kopec

(74) *Attorney, Agent, or Firm* — Yue (Robert) Xu; Apex Attorneys at Law, LLP

(57) ABSTRACT

In the present disclosure, a low-silver-content high-performance conductive paste and a preparation method therefor are provided. The conductive paste comprises the following raw material components in percentage by weight: 8-12.32% of silver nanowires, and 22-4.55% of at least one of spherical silver powder and flaky silver powder, with the balance being a cross-linking agent; the length-to-diameter ratio of the silver nanowires is 10-500. The method comprises the following steps: 1) taking silver nanowires and spherical/flaky silver powder, and adding same to the cross-linking agent; 2) performing ultrasonic oscillation or stirring treatment for 0.5-1 h to prepare uniformly dispersed silver nanowire conductive ink; 3) attaching the conductive ink to a substrate to form a conductive metal layer; 4) placing the conductive metal layer in a drying oven for drying, and finally curing and forming the conductive metal layer to obtain a high-performance conductive material.

4 Claims, No Drawings

LOW-SILVER-CONTENT HIGH-PERFORMANCE CONDUCTIVE PASTE AND PREPARATION METHOD THEREFOR

This application is the national phase of International Application No. PCT/CN2022/131294, titled "LOW-SILVER-CONTENT HIGH-PERFORMANCE CONDUCTIVE PASTE AND PREPARATION METHOD THEREPOR", filed on Nov. 11, 2022, which claims the priority to Chinese Patent Application No. 202111338627.4, titled "LOW-SILVER-CONTENT HIGH-PERFORMANCE CONDUCTIVE PASTE AND PREPARATION METHOD THEREPOR", filed on Nov. 12, 2021, with the China National Intellectual Property Administration, which are incorporated herein by reference in entirety.

FIELD

The present disclosure relates to a low-silver-content high-performance conductive paste and a preparation method therefor.

BACKGROUND

Due to the rapid development of miniaturization and high density of electronic elements, conductive adhesive can be made into paste to achieve very high linear resolution. Moreover, conductive adhesive is easy to operate and can improve production efficiency. Therefore, conductive adhesive has been widely used in various photoelectric fields, and it is an ideal alternative to replace lead-tin welding and realize conductive connection. At present, its annual output value is about 45 billion US dollars.

According to the IDTechEx report, the market of conductive ink and paste reached 2.3 billion US dollars in 2015, and it will continue to grow. By 2025, this market is expected to grow to about 3.2 billion US dollars, with a compound annual growth rate of 3.26% in 10 years.

According to the report released by SEMI and AEI-Linx Consulting, at present, conductive paste and conductive ink account for about a quarter of the total material cost of crystal silicon solar cells. In the next few years, promoting cost reduction and technological innovation are all the main development goals in the field of solar energy.

The existing silver nanowire doped conductive material has high total doping amount of silver and high cost.

For example, the Chinese patent with the publication number of CN102676102A discloses a silver nanowire doped conductive silver adhesive and a preparation method thereof. The silver nanowire doped conductive silver adhesive is prepared from raw materials comprising the following components in percentage by weight: 25% to 60% of micron silver powder; 5% to 30% of silver nanowires; 20% to 50% of epoxy resin; 1.6% to 4% of curing agent; 5.8% to 9.2% of solvent; 0.4% to 1.6% of accelerator; 0.04% to 0.16% of toughening agent; 0.8% to 2.4% of additive, wherein a resistivity of the silver nanowire doped conductive silver adhesive is below $10^{-4}$ Ω·cm, and a total doping amount of silver is 35% to 45%.

For example, the Chinese patent with the publication number of CN103000252A discloses a solar cell back silver paste with ultra-low content of silver, comprising the following components in percentage by weight: 5% to 10% of star-shaped multi-branched silver powder, 10% to 15% of flake silver powder, 15% to 25% of spherical or near-spherical silver powder, 1% to 8% of glass powder, 10% to 15% of organic binder, 22% to 59% of solvent and 0% to 0.5% of auxiliary agent, wherein, the sum of the weight percentages of each component is 100%, and the sum of the weight percentages of star-shaped multi-branched silver powder, flaky silver powder and spherical silver powder is 30% to 50%; the average number of branches of the star-shaped multi-branched silver powder is 5 to 8, and various branches on a single silver powder are arranged in three dimensions, showing a three-dimensional pattern emitted outside from a central point; a single branch has an average length of 2 μm to 5 μm and an average width of 0.5 μm to 2 μm; the whole silver powder particle has an average cluster size of 5 μm to 10 μm; and the silver content is 35% to 50%.

SUMMARY

One of the technical problems to be solved in the present disclosure is to provide a low-silver-content high-performance conductive paste, in which the total silver content in the conductive paste is as low as 16.87%, and the conductive metal layer made of the conductive paste further has excellent properties of stable electrical performance, high conductivity ($\rho<52$ μΩ·m) and excellent adhesiveness (adhesion=5B, hardness=5H).

In the present disclosure, one of the above-mentioned technical problems is achieved as follows:

Provided is a low-silver-content high-performance conductive paste, comprising the following raw material components in percentage by weight:

8% to 12.32% of silver nanowires, and 22% to 4.55% of at least one of spherical silver powder and flaky silver powder, with the balance being a crosslinking agent.

Further, specifically, the conductive paste comprises the following raw material components in percentage by weight: 8.62% to 10.43% of silver nanowires, and 21.23% to 6.55% of at least one of spherical silver powder and flaky silver powder.

Further, specifically, the conductive paste comprises the following raw material components in percentage by weight: 8.62% to 10.43% of silver nanowires, 1% to 10% of spherical silver powder and 3% to 15% of flaky silver powder.

Further, specifically, the conductive paste comprises the following raw material components in percentage by weight: 9% to 10.5% of silver nanowires, 1.3% to 7% of spherical silver powder and 3% to 15% of flaky silver powder.

Further, the spherical silver powder is spherical silver-coated copper particles.

Further, the silver nanowires have a length-diameter ratio of 10 to 500.

Further, the crosslinking agent is at least one of polyurethane, epoxy resin, polymethyl methacrylate, polyvinyl chloride and polystyrene.

A second technical problem to be solved in the present disclosure is to provide a method for preparing low-silver-content high-performance conductive material, in which the total silver content in the conductive paste is as low as 16.87%, and the conductive metal layer made of the conductive paste further has excellent properties of stable electrical performance, high conductivity ($\rho<52$ μΩ·m) and excellent adhesiveness (adhesion=5B, hardness=5H).

In the present disclosure, the second technical problem is achieved as follows:

Provided is a method for preparing low-silver-content high-performance conductive material, comprising the following steps:

1) taking certain amounts of silver nanowires and spherical/flaky silver powder and adding them into an appropriate amount of crosslinking agent;
2) performing ultrasonic oscillation or stirring treatment for 0.5 h to 1 h, so that the silver nanowires in the mixture obtained in the step 1) are in a homogeneous state, to prepare a uniformly dispersed silver nanowire conductive ink;
3) attaching the conductive ink to a substrate to form a conductive metal layer;
4) placing the conductive metal layer obtained in the step 3) in an oven for drying, and finally curing and forming the conductive metal layer to obtain a high-performance conductive material.

Further, various raw materials in the step 1) are in mass percentage contents as follows: 8% to 12.32% of silver nanowires, 22% to 4.55% of at least one of spherical silver powder and flaky silver powder, with the balance being a crosslinking agent.

Further, specifically, the various raw materials in the step 1) are in mass percentage contents as follows: 8.62% to 10.43% of silver nanowires, and 21.23% to 6.55% of at least one of spherical silver powder and flaky silver powder.

Further, the silver nanowire has a length-diameter ratio of 10 to 500.

Further, the crosslinking agent is at least one of polyurethane, epoxy resin, polymethyl methacrylate, polyvinyl chloride and polystyrene.

Further, a temperature of drying in the step 4) is above 150° C.

The present disclosure has the following advantages:

In the present disclosure, the reasonable ratio of silver nanowires to spherical/flaky silver powder in the conductive paste will reduce the total silver content in the conductive paste from the existing 80% to 16.87%, and furthermore the conductive metal layer made of the conductive paste has excellent properties of stable electrical performance, high conductivity ($\rho<52\ \mu\Omega\cdot m$) and excellent adhesiveness (adhesion=5B, hardness=5H).

DETAILED DESCRIPTION

The technical solutions in the present disclosure will be described clearly and completely in conjunction with embodiments hereinafter. All other embodiments obtained by those skilled in the art based on the embodiments in the present disclosure without any creative work fall in the scope of protection in the present disclosure. Those embodiments without indicated specific conditions were carried out according to the conventional conditions or the conditions suggested by the manufacturer. The reagents or instruments used without indicated manufacturer were all conventional products that could be commercially available.

The present disclosure relates to a low-silver-content high-performance conductive paste, comprising the following raw material components in percentage by weight:

8% to 12.32% of silver nanowires, and 22% to 4.55% of at least one of spherical silver powder and flaky silver powder, with the balance being a crosslinking agent.

Preferably, the conductive paste comprises the following raw material components in percentage by weight: 8.62% to 10.43% of silver nanowires, and 21.23% to 6.55% of at least one of spherical silver powder and flaky silver powder.

The silver nanowires have a length-diameter ratio of 10 to 500.

The crosslinking agent is at least one of polyurethane, epoxy resin, polymethyl methacrylate, polyvinyl chloride and polystyrene.

The present disclosure further relates to a method for preparing low-silver-content high-performance conductive material, comprising the following steps:

1) taking certain amounts of silver nanowires and spherical/flaky silver powder and adding them into an appropriate amount of crosslinking agent;
2) performing ultrasonic oscillation or stirring treatment for 0.5 h to 1 h, so that the silver nanowires in the mixture obtained in the step 1) are in a homogeneous state, to prepare a uniformly dispersed silver nanowire conductive ink;
3) attaching the conductive ink to a substrate to form a conductive metal layer;
4) placing the conductive metal layer obtained in the step 3) in an oven for drying, and finally curing and forming the conductive metal layer to obtain a high-performance conductive material.

The various raw materials in the step 1) are in mass percentage contents as follows: 8% to 12.32% of silver nanowires, 22% to 4.55% of at least one of spherical silver powder and flaky silver powder, with the balance being a crosslinking agent.

Preferably, the various raw materials in the step 1) are in mass percentage contents as follows: 8.62% to 10.43% of silver nanowires, and 21.23% to 6.55% of at least one of spherical silver powder and flaky silver powder.

The silver nanowire has a length-diameter ratio of 10 to 500. The crosslinking agent is at least one of polyurethane, epoxy resin, polymethyl methacrylate, polyvinyl chloride and polystyrene.

The temperature of drying in the step 4) is above 150° C.

The technical solutions in the present disclosure will be further explained in conjunction with examples and comparative examples, but the present disclosure is not limited thereto.

Provided is a method for preparing low-silver-content high-performance conductive material. The steps of the method are as follows:

1) Certain amounts of silver nanowires, spherical silver-coated copper particles and flaky silver powder were taken and added into a polyurethane (PU) solution.
2) The mixture was subjected to an ultrasonic oscillation treatment for 0.5 h to 1 h, so that the silver nanowires in the mixture obtained in the step 1) were in a homogeneous state, to prepare a uniformly dispersed silver nanowire conductive ink;
3) The silver nanowire conductive ink was formed on a substrate by screen printing to form a conductive metal layer, to complete the preparation of the conductive ink.
4) The conductive metal layer obtained in the step 3) was placed in an oven for drying (drying temperatures were 150° C., 250° C. and 350° C. respectively) to cure and form the conductive metal layer.
5) Finally the resistivity, adhesion and hardness of the conductive metal layer on the substrate were measured.

Table 1 below shows the composition and contents of raw materials in the conductive pastes of Examples and Comparative Examples prepared by the above-mentioned method. Table 2 shows the performance parameters of components in various examples and comparative examples at different drying temperatures.

TABLE 1

| Experimental Groups | content of total silver (wt %) | content of flaky silver powder (wt %) | spherical silver-coated copper particles (wt %) | content of silver nanowires (wt %) |
|---|---|---|---|---|
| Example 1 | 29.85 | 14.56 | 6.67 | 8.62 |
| Example 2 | 25.82 | 10.3 | 5.09 | 10.43 |
| Example 3 | 18.12 | 5.5 | 2.19 | 10.43 |
| Example 4 | 16.87 | 3.2 | 1.35 | 12.32 |
| Comparative Example 1 | 68.93 | 45 | 21.67 | 2.26 |
| Comparative Example 2 | 71.57 | 64.28 | 17.91 | 0.11 |
| Comparative Example 3 | 85 | 82 | 2.95 | 0.05 |

TABLE 2

| Experimental Groups | resistivity at 150° C. (μΩ · m) | adhesion at 150° C. (cross-cut test, PET) | hardness at 150° C. | resistivity at 250° C. (μΩ · m) | resistivity at 350° C. (μΩ · m) |
|---|---|---|---|---|---|
| Example 1 | 38.58 | 5B | 5H | 28.72 | 8.77 |
| Example 2 | 40.8 | 5B | 5H | 24 | 10.44 |
| Example 3 | 44.35 | 5B | 5H | 34.22 | 23.8 |
| Example 4 | 51.97 | 5B | 5H | 34.89 | 39.31 |
| Comparative Example 1 | 47.79 | 5B | 4H | 35.06 | 22.9 |
| Comparative Example 2 | 48.5 | 4B | 4H | 38.12 | 33.75 |
| Comparative Example 3 | 69.58 | 4B | 3H | 60.23 | 48.72 |

To sum up, the reasonable ratio of silver nanowires to spherical/flaky silver powder in the conductive paste of the present disclosure reduces the total silver content in the conductive paste from the existing 80% to 16.87%, and furthermore the conductive metal layer made of the conductive paste has excellent properties of stable electrical performance, high conductivity 5 ($\rho<52$ μΩ·m) and excellent adhesiveness (adhesion=5B, hardness=5H).

Although the specific embodiments of the present disclosure have been described above, those familiar with the technical field should understand that the specific embodiments we have described are only illustrative, but are not intended to limit the scope of the present disclosure. Equivalent modifications and changes made by those familiar with the field in accordance with the spirit of the present disclosure should be covered by the scope of the claims of the present disclosure.

The invention claimed is:

1. A low-silver-content high-performance conductive paste, comprising the following raw material components in percentage by weight:

10.43% to 12.32% of silver nanowires, 1.35% to 2.19% of spherical silver-coated copper particles and 3.2% to 5.5% of flaky silver powder, with the balance being polyurethane.

2. The low-silver-content high-performance conductive paste according to claim 1, wherein the silver nanowires have a length-diameter ratio of 10 to 500.

3. A method for preparing a low-silver-content high-performance conductive material, comprising the following steps:

1) Taking certain amounts of silver nanowires and spherical/flaky silver powder and adding them into an appropriate amount of crosslinking agent;
2) performing ultrasonic oscillation or stirring treatment for 0.5 h to 1 h, so that the silver nanowires in the mixture obtained in the step 1) are in a homogeneous state, to prepare a uniformly dispersed silver nanowire conductive ink;
3) attaching the conductive ink to a substrate to form a conductive metal layer;
4) Placing the conductive metal layer obtained in the step 3) in an oven for drying, and finally curing and forming the conductive metal layer to obtain a high-performance conductive material, wherein various raw materials in the step 1) are in mass percentage contents as follows: 10.43% to 12.32% of silver nanowires, 1.35% to 2.19% of spherical silver-coated copper particles and 3.2% to 5.5% of flaky silver powder, with the balance being polyurethane.

4. The method for preparing the low-silver-content high-performance conductive material according to claim 3, wherein a temperature of drying in the step 4) Is above 150° C.

* * * * *